Patented Jan. 9, 1951

2,537,881

UNITED STATES PATENT OFFICE 2,537,881

LACTONIZATION OF α-ACYLOXYACRYLO-NITRILE POLYMERS

Joseph B. Dickey, Rochester, N. Y., assignor to Eastman Kodak Company, Rochester, N. Y., a corporation of New Jersey No Drawing. Application October 1, 1947, Serial No. 777,376

14 Claims. (Cl. 260—85.5)

This invention relates to the preparation of new polymeric derivatives of α-acyloxyacrylonitriles and lactonization of these polymeric materials.

α-Acetoxyacrylonitrile (1-cyanovinyl acetate) can be prepared by the interaction of ketene and hydrogen cyanide in the presence of an organic tertiary amine as shown by U. S. Patent 2,395,930, dated March 5, 1946, and German Patent 736,504, ausgegeben June 21, 1943. α-Acetoxyacrylonitrile, as well as other acyloxyacrylonitriles, can also be prepared by splitting hydrogen chloride from α-acetoxy-β-chloropropionitrile, as shown by U. S. Patent 2,266,771, dated December 25, 1941, and French Patent 859,542, délivré June 10, 1940.

I have now found that α-acyloxyacrylonitriles can be copolymerized with certain compounds containing the —CH=C< group, and even though the resulting copolymers contain a high percentage of the α-acyloxyacrylonitrile, the copolymers are soluble in a number of the common organic solvents. On the other hand, copolymers of acrylonitrile or α-methacrylonitrile with most compounds containing a —CH=C< group, containing a high percentage of the acrylonitrile or α-methacrylonitrile, are very insoluble substances, requiring special solvents to form solutions from which threads can be spun or films coated.

I have further found that the copolymers of α-acyloxy-acrylonitriles and unsaturated compounds containing a —CH=C< group can be partially or completely hydrolyzed in the presence of a primary alcohol liquid at 20° C. and an acid deesterification catalyst to produce linear, polymeric, resinous lactones.

Resinous lactones have previously been prepared from a copolymer of maleic anhydride and vinyl acetate by treating the copolymer with an alcohol, such as n-butyl alcohol, and water, in the presence of sulfuric acid (see United States Patent 2,306,071, dated December 22, 1942). Such resinous lactones have the following structural formula:

I

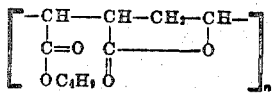

Resinous lactones have also been prepared from a copolymer of methyl acrylate and vinyl acetate by saponifying the copolymer with alkali (see United States Patent 2,067,706, dated January 12, 1937). Such resinous lactones have the following probable structural formula:

II

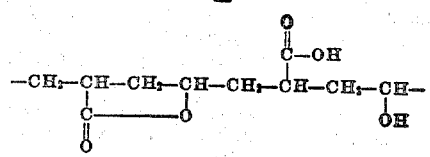

Resinous lactones can also be prepared from copolymers of methyl acrylate and vinyl acetate by treatment of the copolymer with an alcohol, such as methyl alcohol, water and an acid catalyst (see United States Patent 2,403,004, dated July 2, 1946). Such resinous lactones contain both carbalkoxyl groups and lactone groups and can be represented by the following probable structural formula:

III

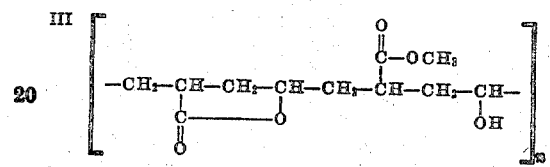

The resinous lactones represented by Formulas I and III above are soluble in organic solvents, such as acetone, a mixture of methyl alcohol and acetone and 1,4-dioxane; and their behavior in such solvents is reminiscent of the behavior of cellulose esters.

In accordance with my invention, I first polymerize a mixture of an acyloxyacrylonitrile and another compound containing a —CH=C< group. The formed copolymer is then lactonized by heating with a primary alcohol liquid at 20° C. and an acid de-esterification catalyst.

The α-acyloxyacrylonitriles which I can advantageously use can be represented by the formula:

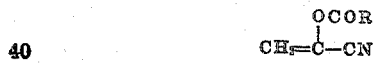

wherein R is an alkyl group, such as methyl, ethyl, n-propyl, and isopropyl (i. e. an alkyl group having the formula $C_nH_{2n+1}$ where $n$ is a positive integer from 1 to 3). Typical are α-acetoxyacrylonitrile, α-propionoxyacrylonitrile, α-n-butyroxyacrylonitrile, and α-isobutyroxyacrylonitrile.

Typical compounds containing the —CH=C< group which I copolymerize with the α-acyloxyacrylonitriles include: vinyl acetate, vinyl propionate, vinyl butyrate, vinyl isobutyrate, vinyl benzoate, divinyl phthalate, vinyl chloroacetate, methyl acrylate, ethyl acrylate, n-propyl acrylate, isopropyl acrylate, n-butyl acrylate, isobutyl acrylate, secondary butyl acrylate, methyl α- methacrylate, ethyl α-methacrylate, propyl α-methacrylate, isopropyl α-methacrylate, n-butyl α-methacrylate, isobutyl α-methacrylate, secondary butyl α-methacrylate, benzyl acrylate, benzyl α-methacrylate, vinyl chloride, vinylidene chloride, styrene, α-methylstyrene, α-acetoxystyrene, α-chlorostyrene, p-acetaminostyrene, p-sulfamylstyrene, isopropenyl acetate, isopropenyl propionate, methyl α-chloroacrylate, ethyl α-chloroacrylate, n-propyl α-chloroacrylate, acrylamide, N-methyl acrylamide, N-ethyl acrylamide, N,N-diethyl acrylamide, α-metharcylamide, acrylonitrile, α-methacrylonitrile, dimethyl fumarate, diethyl fumarate, di-n-propyl fumarate, diisopropyl fumarate, di-n-butyl fumarate, dimethyl maleate, diethyl maleate, di-n-propyl maleate, diisopropyl maleate, di-n-butyl maleate, dibenzyl fumarate, dibenzyl maleate, diallyl fumarate, dimethallyl fumarate, diallyl maleate, dimethallyl maleate, methyl vinyl ketone, ethyl vinyl ketone, n-propyl vinyl ketone, n-butyl vinyl ketone, methyl isopropenyl ketone, ethyl isopropenyl ketone, divinyl ketone, diisopropenyl ketone, β-chloroallyl acetate, methyl α-chloroacrylate, β-chloro-α-methallyl acetate, maleic anhydride, α-chloroacrylonitrile, vinyl sulfonamide, α-methyl vinyl sulfonamide, maelic imide, N-butyl maelic imide, α-chloroacrylic acid, acrylic acid, α-methacrylic acid, maelic acid, fumaric acid, fumaronitrile, maleic nitrile, itaconic acid, citraconic acid, methyl itaconate, ethyl itaconate, and the like.

The copolymerization is accelerated by heat or the well-known polymerization catalysts. Exemplary of such catalysts are the organic peroxides (e. g. benzoyl peroxide, acetyl peroxide, acetyl benzoyl peroxide, lauroyl peroxide, oleoyl peroxide, etc.), inorganic peroxides, such as hydrogen peroxide, perborates (e. g. sodium and potassium perborates), and persulfates (e. g. sodium, potassium, and ammonium persulfates). The copolymerization can be carried out by the mass method, or by the bead or emulsion method in which water or some other medium in which the monomers are insoluble is employed as a dispersing medium, with or without emulsifying agents. The copolymerization can also be effected in the presence of a diluent. The diluent, if employed, is advantageously a solvent for the copolymer. The diluent need not dissolve the copolymer, but the monomers can be dissolved in such a solvent, and the copolymer precipitated therefrom as it is formed.

The temperature at which the copolymerization can be effected can vary from ordinary room temperature (approximately 20° C.) to 100° C. Advantageously, I can use a temperature of from 40–80° C.

Generally, any ratio of an α-acyloxyacrylonitrile to the compound containing a —CH=C< group can be used. Advantageously, I can use a ratio by weight of 3:1 parts of an α-acyloxyacrylonitrile to 1:3 parts of a compound containing a —CH=C< group, representing approximately 30–70% of an α-acyloxyacrylonitrile in the monomeric mixture prior to polymerization, the remainder of the mixture consisting of at least one compound containing a —CH=C< group. A more limited ratio which I can advantageously use is 2:1 parts by weight of an α-acyloxyacrylonitrile to 1:2 parts by weight of the other unsaturated compound.

The following examples will illustrate further the manner in which I prepare the copolymers of my invention.

*Example I.—Copolymer of α-acetoxyacrylonitrile and styrene*

10.8 g. of α-acetoxyacrylonitrile, 10.4 g. of styrene, and 0.02 g. of benzoyl peroxide were placed in a sealed tube under an atmosphere of nitrogen, and polymerized at 50° C. When the polymerization was complete, the yellowish solid was removed, dissolved in acetone and precipitated in water.

In place of styrene, a molecularly equivalent amount of α-methylstyrene or 2,4-dichlorostyrene can be employed.

*Example II.—Copolymer of α-acetoxyacrylonitrile and acrylonitrile*

10.8 g. of α-acetoxyacrylonitrile, 5.3 g. of acrylonitrile, and 0.005 g. of benzoyl peroxide were heated at 40° C. until polymerization was complete. A yellowish polymer which was insoluble in acetone was obtained.

By substituting molecularly equivalent amounts of α-methacrylonitrile, α-chloroacrylonitrile, or fumaronitrile in the above example, other copolymers of α-acetoxyacrylonitrile can be prepared.

*Example III.—Copolymer of α-acetoxyacrylonitrile and methyl α-methacrylate*

10.8 g. of α-acetoxyacrylonitrile, 10.0 g. of methyl α-methacrylate, and 0.01 g. of benzoyl peroxide were placed in a sealed tube under an atmosphere of nitrogen, and polymerized at 40° C. A yellowish copolymer which is soluble in acetone was obtained. This copolymer was found to be particularly valuable for molding, coating into films, and the like.

By substituting methyl acrylate, ethyl α-methacrylate, n-butyl α-methacrylate, or n-butyl acrylate in molecularly equivalent amounts in the above example, other copolymers can be prepared. Likewise, α-n-butyroxyacrylonitrile or α-isobutyroxyacrylonitrile can replace α-acetoxyacrylonitrile in the above example.

*Example IV.—Copolymer of α-acetoxyacrylonitrile and methyl vinyl ketone*

10.8 g. of α-acetoxyacrylonitrile, 20.0 g. of methyl vinyl ketone, and 0.5 g. of benzoyl peroxide were placed in a sealed tube under an atmosphere of nitrogen and polymerized at 60° C. A hard, yellowish polymer which was soluble in acetone was obtained. An acetone solution of the polymer was poured into water, giving a precipitate of the polymer. The partially purified polymer was again dissolved in acetone and precipitated by pouring into water.

By substituting molecularly equivalent amounts of ethyl vinyl ketone, methyl isopropenyl ketone, ethyl isopropenyl ketone, or vinyl isopropenyl ketone in the above example, other copolymers can be prepared.

*Example V.—Copolymer of α-acetoxyacrylonitrile and vinyl sulfonamide*

10.8 g. of α-acetoxyacrylonitrile, 25.0 g. of vinyl sulfonamide, and 0.1 g. of benzoyl were polymerized by heating in an acetic acid solution at 50° C. The polymerization was completed by heating at 80–90° C. for several hours. The reaction mixture was then poured into water, filtered, and again washed with water. The polymer was separated from the aqueous medium and dried in vacuo.

In place of vinyl sulfonamide, a molecularly equivalent amount of α-methyl vinyl sulfonamide can be used.

*Example VI.—Copolymer of α-acetoxyacrylonitrile and isopropenyl acetate*

10.8 g. of α-acetoxyacrylonitrile, 25.0 g. of isopropenyl acetate, and 0.5 g. of benzoyl peroxide were placed in a sealed tube under an atmosphere of nitrogen and polymerized at 80° C. The resulting yellowish-solid was dissolved in acetone, and then precipitated by pouring into water. The yellowish-white solid thus obtained was found to be suitable for molding, coating to form films, etc.

By substituting a molecular equivalent amounts of vinyl acetate, vinyl propionate, vinyl butyrate, or isopropenyl propionate in the above example, other copolymers can be prepared.

*Example VII.—Copolymer of α-acetoxyacrylonitrile, dimethyl fumarate, and diethyl fumarate*

10.8 g. of α-acetoxyacrylonitrile, 10.0 g. of dimethyl fumarate, 15.0 g. of diethyl fumarate, and 0.2 g. of benzoyl peroxide were placed in a sealed tube under an atmosphere of nitrogen and polymerized at 50° C. The polymerization was completed by heating at 100° C. for several hours. The yellowish-solid which resulted was purified by dissolving in acetone and precipitating the polymer in distilled water.

By substituting a molecularly equivalent amount of diisopropyl fumarate or di-n-butyl maleate in the above example, other copolymers can be prepared.

*Example VIII.—Copolymer of α-acetoxyacrylonitrile and acrylamide*

10.8 g. of α-acetoxyacrylonitrile, 20.0 g. of acrylamide, and 0.5 g. of benzoyl peroxide were dissolved in 100 cc. of formic acid and polymerized at 60–70° C. The reaction mixture was poured into water, filtered, and the resulting yellowish-white solid dried in vacuo.

By substituting fumaric amide, itaconic amide, maleic amide, or α-methacrylic amide in molecularly equivalent amounts in the above example, other valuable copolymers can be formed.

*Example IX.—Copolymer of α-acetoxyacrylonitrile and N-butyl maleic imide*

10.8 g. of α-acetoxyacrylonitrile and 20.0 g. of N-butyl maleic imide were mixed and polymerized at room temperature without aid of a catalyst. The resulting yellowish solid was dissolved in acetone and precipitated by pouring the acetone solution into water. The precipitate was then dried in vacuo.

By substituting N-methyl maleic imide or N-ethyl maleic amide in molecularly equivalent amounts in the above example other copolymers can be prepared.

*Example X.—Copolymer of α-propionoxyacrylonitrile, styrene and acrylonitrile*

10.0 g. of α-propionoxyacrylonitrile, 10.0 g. of styrene, 10.0 g. of acrylonitrile, and 0.02 g. of benzoyl peroxide were placed in a sealed-glass tube under an atmosphere of nitrogen and polymerized at 50° C. When the polymerization was complete, the yellowish solid was removed, dissolved in acetone, and precipitated in water.

In another run, identical to that of the above example, the polymerization was stopped when only 20 to 30% complete, and further polymerization inhibited by the addition of phenyl α-naphthylamine to the reaction product. The product was then poured into water, dissolved in acetone, and reprecipitated in water. When an acetone dope of this partially polymerized product was prepared, it was found to be suitable for spinning into fibers.

*Example XI.—Homopolymer of α-acetoxyacrylonitrile*

11 g. of α-acetoxyacrylonitrile were polymerized by heating at 50 to 60° C. in 50 cc. of acetic anhydride under an atmosphere of nitrogen, employing 0.02 g. of benzoyl peroxide as catalyst. The reaction mixture slowly turned slightly yellow and became very viscous. When the viscosity had reached a maximum, the reaction mixture was poured into water. The polymer precipitated as a yellowish-white solid.

α-n-Butyroxyacrylonitrile can be polymerized by substituting a molecularly equivalent amount in the above example.

*Example XII.—Hydrolysis of copolymer of α-acetoxyacrylonitrile and styrene*

10 g. of a copolymer of α-acetoxyacrylonitrile and styrene, prepared as described in Example I, was dissolved in pyridine and a slight excess of 10% alcoholic potassium hydroxide added. The mixture was warmed on a steam bath for 3–4 hours, and the reaction mixture poured into water. The resulting deacetylated, yellowish compound was filtered off, washed again with water, and then dried in vacuo.

*Example XIII.—Copolymer of α-acetoxyacrylonitrile and acrylic acid*

10.8 g. of α-acetoxyacrylonitrile, 15 g. of acrylic acid, and 0.1 g. of benzoyl peroxide were placed in a sealed glass tube under an atmosphere of nitrogen and polymerized by heating at 50° C. for 24 to 48 hours. The resulting yellowish polymer was then cooled and removed from the tube. The resinous copolymer was then purified by dissolving in methyl formamide and pouring the resulting solution into distilled water. The polymer precipitated as a fine yellowish white powder. An acetone dope prepared from the copolymer was suitable for forming film or spinning into warm air to form fibers.

The polymers prepared in accordance with my invention can be completely or partially hydrolyzed by boiling with aqueous caustic or alkali, the hydrolyzed product being reesterified, acetalized or ketalized by methods known to the art. The amide groups of the copolymers may be partially or completely hydrolyzed. Certain of the copolymers prepared above can be dissolved in aqueous solutions of sodium, potassium, zinc, magnesium, or calcium thiocyanates or dinitriles, such as malononitrile, succinonitrile, or adiponitrile, and these solutions spun into alcohols, such as methanol, ethanol, n-propanol, β-methoxy ethanol, tetrahydrofurfuryl alcohol, etc. or ketones, such as acetone, methyl ethyl ketone, diethyl ketone, methyl amyl ketone, etc. to produce fibers.

The polymers of my invention are particularly valuable when lactonized as mentioned above. Advantageously I can lactonize the copolymers of my invention by heating, usually under reflux, the copolymer, a primary alcohol—liquid at 20° C., and an acid deesterification catalyst. After refluxing for several hours, the lactonized reaction mixture can be purified by washing with water and extracting with a suitable solvent.

Substantially any primary alcohol liquid at 20° C. can be used in my lactonization. Advantageously I can use primary alcohols liquid at 20° C. having 1 to 10 carbon atoms. Typical are methanol, ethanol, n-propanol, n-butanol, n-amyl alcohol, n-hexanol, 2-ethylhexanol, n-octanol, n-decanol, 2-methoxyethanol, 2-ethoxyethanol, allyl alcohol, etc. Higher melting alcohols such as cyclohexanol, lauryl alcohol, myristyl alcohol, etc. can also be used, however there is usually no advantage in doing so.

Diluents or solvents can be used during the hydrolysis or lactonization of my copolymers. Such solvents as the cyclic ethers (e. g. 1,4-dioxane, etc.), hydrocarbons boiling above 10° C. (e. g. benzene, toluene, xylene, etc.), chlorinated hydrocarbons (e. g. carbon tetrachloride, chloroform, ethylene dichloride, etc.), and the like are suitable.

The acid deesterification catalysts which I can use are the mineral acids (e. g. hydrochloric, hydrofluoric, sulfuric and phosphoric acids), inorganic acid salts (e. g. sodium hydrogen sulfate, sodium dihydrogen phosphate, etc.), and organic sulfonic acids (e. g. benzene sulfonic, toluene sulfonic, methane disulfonic (methionic), ethane disulfonic (ethionic), etc. acids).

Another embodiment of our invention is the addition of water to the lactonization mixture in order to completely or partially hydrolyze the nitrile or cyano group of the copolymer to a carboxyl group, which is generally immediately esterified by the alcohol present in the reaction mixture. The formed carboxyl group need not be esterified however, but can form a lactone linkage in combination with the hydroxyl group formed by de-acylation or hydrolysis of the polymer. When small amounts of water are employed, the lactonized products consist primarily of lactone linkages with smaller amounts of free carboxyl or ester groups (carboalkoxyl) present. The use of water offers a convenient means for varying the properties of the lactonized products of my invention.

The following examples will illustrate further the manner in which I prepare my lactonized copolymers:

*Example XIV.—Lactonization of the homopolymer of α-acetoxyacrylonitrile*

A solution of 15 g. of poly-α-acetoxyacrylonitrile (prepared as described in Example XI above), 50 cc. of n-butanol, 3.5 g. of distilled water, 10 cc. of hydrogen chloride, and 200 cc. of dioxane was heated under reflux for 3 to 4 hours. The resulting mixture was cooled and then filtered to remove ammonium chloride. The filtrate was washed with water to remove any occluded salts which remained in the resulting fibrous precipitate of resinous lactone. When an acetone dope of the lactonized polymeric α-acetoxyacrylonitrile was prepared, the resinous lactone was found to be suitable for forming films which showed unusual drying and jelling behavior reminscent of that of the cellulose esters.

When a molecularly equivalent amount of a polymer of α-n-butyroxyacrylonitrile is substitued in the above example, a resinous lactone likewise resembling the cellulose esters in coating properties can be obtained.

*Example XV.—Lactonization of copolymer of α-acetoxyacrylonitrile and acrylic acid*

18 g. of a copolymer containing 50% of α-acetoxyacrylonitrile and 50% acrylic acid, prepared as described above in Example XIII, were added to 200 cc. of n-butanol and 14 g. of sulfuric acid. The resulting mixture was heated under reflux for 3 to 4 hours and then cooled. The mixture was poured into water and then filtered. An acetone dope of this lactonized polymer was found to possess film forming properties similar to those of the product of Example XIV above.

When a molecularly equivalent amount of a copolymer of α-propionoxyacrylonitrile and maleic anhydride are substituted in the above example, a resinous lactone, useful for forming films can be formed.

*Example XVI.—Lactonization of copolymer of α-acetoxyacrylonitrile and vinyl acetate*

10 g. of vinyl acetate and 15 g. of α-acetoxyacrylonitrile were placed in a sealed glass tube under an atmosphere of nitrogen and polymerized by heating at 50° C. for 10 hours. The temperature was then slowly raised to approximately 100° C. for 10 hours. The resulting polymer was cooled and then removed from the tube. The tough, slightly colored polymer was then added to a solution of 200 cc. of n-butanol, 15 cc. of sulfuric acid, and 5 cc. of distilled water, and refluxed for 3 to 4 hours. The reaction product was then poured into water and filtered. An acetone dope of the resinous lactone thus prepared had film forming properties typical of this class of α-acyloxyacrylonitrile lactonized copolymers.

By substituting a molecularly equivalent amount of a copolymer of α-acetoxyacrylonitrile and isopropenyl acetate in the above example, a lactonized resin suitable for forming films can be obtained.

*Example XVII.—Lactonization of copolymer of α-acetoxyacrylonitrile, acrylic acid, and methyl α-chloroacrylate*

10 g. of α-acetoxyacrylonitrile, 10 g. of acrylic acid, 10 g. of methyl α-chloroacrylate, and 0.2 g. of benzoyl peroxide were placed in a sealed glass tube under an atmosphere of nitrogen and polymerized by heating at 70° C. The resulting resinous polymer was then added to 50 cc. of n-butanol, 3.5 g. of distilled water, 10 cc. of hydrogen chloride, and 200 cc. dioxane, and the solution heated under reflux for 3 to 4 hours. The resulting resinous lactone was cooled, filtered, and then washed free of ammonium chloride with distilled water.

By substituting molecularly equivalent amounts of ethyl α-chloroacrylate for methyl α-chloroacrylic, and α-methacrylic acid for acrylic acid in the above example, a resinous lactone having the jelling behavior reminiscent of cellulose esters can be obtained.

*Example XVIII.—Lactonization of copolymer of α-acetoxyacrylonitrile and α-chloroacrylic acid*

10 g. of α-acetoxyacrylonitrile, 10 g. of α-chloroacrylic acid, and 0.5 g. of benzoyl peroxide were polymerized by heating at 65–70° C. under an atmosphere of nitrogen. The resulting, yellowish polymer was then added to 75 cc. of n-butanol, 4 g. of distilled water, and 300 cc. of dioxane. The resulting solution was then refluxed for 3 to 4 hours, and the reaction mixture cooled. The resinous lactone obtained was filtered and washed with distilled water to remove occluded ammonium chloride. Acetone was added to the resinous lactone to produce a dope which was found suitable for coating to form tough films.

By substituting a molecularly equivalent amount of α-isobutyroxyacrylonitrile in the above example, a yellowish-white resinous lactone can be obtained.

Other resinous lactones can be prepared in a similar manner by substituting copolymers of other α-acyloxyacrylonitriles and compounds containing a —CH=C< in the above examples. Other alcohols and deesterification catalysts can be employed without difficulty.

I claim:

1. A process for preparing a linear polymeric resinous lactone, comprising hydrolyzing a polymer of an α-acyloxyacrylonitrile represented by the formula:

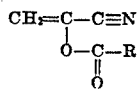

wherein R represents an alkyl group having the formula $C_nH_{2n+1}$ wherein $n$ is a positive integer from 1 to 3, in the presence of a primary monohydric alcohol liquid at 20° C. and an acid deesterification catalyst selected from the group consisting of hydrochloric acid, hydrofluoric acid, sulfuric acid, phosphoric acid, sodium hydrogen sulfate, sodium dihydrogen phosphate, benzenesulfonic acid, toluenesulfonic acid, methanedisulfonic acid, and ethanedisulfonic acid.

2. A process for preparing a linear polymeric resinous lactone, comprising hydrolyzing a polymer of an α-acyloxyacrylonitrile represented by the formula:

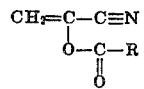

wherein R represents an alkyl group having the formula $C_nH_{2n+1}$ wherein $n$ is a positive integer from 1 to 3, in the presence of a primary monohydric alcohol liquid at 20° C. and sulfuric acid.

3. A process for preparing a linear polymeric resinous lactone, comprising hydrolyzing a polymer of α-acetoxyacrylonitrile, represented by the formula:

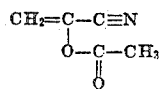

in the presence of a primary monohydric alcohol liquid at 20° C. and sulfuric acid.

4. A process for preparing a linear polymeric resinous lactone, comprising hydrolyzing a polymer of an α-acyloxyacrylonitrile represented by the formula:

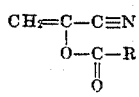

wherein R represents an alkyl group having the formula $C_nH_{2n+1}$ wherein $n$ is a positive integer from 1 to 3, in the presence of a primary monohydric alcohol liquid at 20° C. and hydrochloric acid.

5. A process for preparing a linear polymeric resinous lactone, comprising hydrolyzing a polymer of α-acetoxyacrylonitrile represented by the formula:

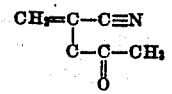

in the presence of a primary monohydric alcohol liquid at 20° C. and hydrochloric acid.

6. A process for preparing a linear polymeric resinous lactone, comprising hydrolyzing a polymer of an α-acyloxyacrylonitrile represented by the formula:

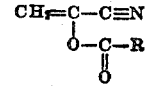

wherein R represents an alkyl group having the formula $C_nH_{2n+1}$ wherein $n$ is a positive integer from 1 to 3, in the presence of n-butanol and sulfuric acid.

7. A process for preparing a linear polymeric resinous lactone, comprising hydrolyzing a polymer of α-acetoxyacrylonitrile, represented by the formula:

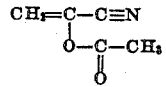

in the presence of n-butanol and sulfuric acid.

8. A process for preparing a linear polymeric resinous lactone, comprising hydrolyzing a polymer of an α-acyloxyacrylonitrile represented by the formula:

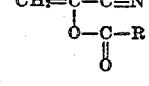

wherein R represents an alkyl group having the formula $C_nH_{2n+1}$ wherein $n$ is a positive integer from 1 to 3, in the presence of n-butanol and hydrochloric acid.

9. A process for preparing a linear polymeric resinous lactone, comprising hydrolyzing a polymer of α-acetoxyacrylonitrile, represented by the formula:

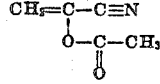

in the presence of n-butanol and hydrochloric acid.

10. A process for preparing a linear polymeric resinous lactone, comprising hydrolyzing a homopolymer of α-acetoxyacrylonitrile in the presence of a primary monohydric alcohol liquid at 20° C. and sulfuric acid.

11. A process for preparing a linear polymeric resinous lactone, comprising hydrolyzing a homopolymer of α-acetoxyacrylonitrile in the presence of an aliphatic primary monohydric alcohol having from 1 to 5 carbon atoms and sulfuric acid.

12. A process for preparing a linear polymeric resinous lactone, comprising hydrolyzing a copolymer of α-acetoxyacrylonitrile and acrylic acid in the presence of a primary monohydric alcohol liquid at 20° C. and sulfuric acid.

13. A process for preparing a linear polymeric resinous lactone, comprising hydrolyzing a copolymer of α-acetoxyacrylonitrile and acrylic acid in the presence of an aliphatic primary monohydric alcohol having from 1 to 5 carbon atoms and sulfuric acid.

14. A process for preparing a linear, polymeric, resinous lactone, which comprises hydrolyzing a copolymer of α-acetoxyacrylonitrile and a vinyl ester of a carboxylic acid containing from 2 to 4 carbon atoms in the presence of a primary monohydric alcohol liquid at 20° C. and sulfuric acid.

JOSEPH B. DICKEY.

REFERENCES CITED

The following references are of record in the file of this patent:

UNITED STATES PATENTS

| Number | Name | Date |
|---|---|---|
| 2,332,899 | D'Alelio | Oct. 26, 1943 |
| 2,395,930 | Johnson | Mar. 5, 1946 |

FOREIGN PATENTS

| Number | Country | Date |
|---|---|---|
| 477,885 | Great Britain | Jan. 7, 1938 |

OTHER REFERENCES

Deakin et al.: "Journ. Chem. Soc." (London), vol. 97, pages 1968–1978 (1910).

Certificate of Correction

Patent No. 2,537,881 January 9, 1951

JOSEPH B. DICKEY

It is hereby certified that error appears in the printed specification of the above numbered patent requiring correction as follows:

Column 10, lines 3 to 5, for that portion of the formula reading "$=\underset{\underset{O}{|}}{C}-C$" read $=\underset{\underset{O}{|}}{C}-C$ and that the said Letters Patent should be read as corrected above, so that the same may conform to the record of the case in the Patent Office.

Signed and sealed this 20th day of March, A. D. 1951.

[SEAL]

THOMAS F. MURPHY,
*Assistant Commissioner of Patents.*